United States Patent
Haruta et al.

(10) Patent No.: US 10,919,668 B2
(45) Date of Patent: Feb. 16, 2021

(54) POLYESTER LABEL AND PACKAGING CONTAINER

(71) Applicant: TOYOBO CO., LTD., Osaka (JP)

(72) Inventors: Masayuki Haruta, Tsuruga (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 104 days.

(21) Appl. No.: 15/763,702

(22) PCT Filed: Sep. 28, 2016

(86) PCT No.: PCT/JP2016/078707
§ 371 (c)(1),
(2) Date: Mar. 27, 2018

(87) PCT Pub. No.: WO2017/057506
PCT Pub. Date: Apr. 6, 2017

(65) Prior Publication Data
US 2018/0319539 A1 Nov. 8, 2018

(30) Foreign Application Priority Data
Sep. 30, 2015 (JP) .............................. JP2015-195298

(51) Int. Cl.

| | | |
|---|---|---|
| G09F 3/04 | (2006.01) | |
| B65D 75/00 | (2006.01) | |
| B32B 27/36 | (2006.01) | |
| B65D 23/08 | (2006.01) | |
| C08J 5/18 | (2006.01) | |
| C08G 63/16 | (2006.01) | |
| B29D 7/01 | (2006.01) | |
| C08G 63/183 | (2006.01) | |
| C08G 63/195 | (2006.01) | |
| B29L 31/00 | (2006.01) | |
| B29C 55/00 | (2006.01) | |
| B29C 55/14 | (2006.01) | |
| B29C 63/42 | (2006.01) | |
| B29K 67/00 | (2006.01) | |
| B29C 63/00 | (2006.01) | |

(52) U.S. Cl.
CPC ........... *B65D 23/0821* (2013.01); *B29D 7/01* (2013.01); *B65D 23/0878* (2013.01); *B65D 75/002* (2013.01); *C08G 63/16* (2013.01); *C08G 63/183* (2013.01); *C08G 63/195* (2013.01); *C08J 5/18* (2013.01); *G09F 3/04* (2013.01); *B29C 55/005* (2013.01); *B29C 55/143* (2013.01); *B29C 63/0017* (2013.01); *B29C 63/423* (2013.01); *B29K 2067/00* (2013.01); *B29K 2995/0049* (2013.01); *B29L 2031/7158* (2013.01); *B29L 2031/744* (2013.01); *B32B 27/36* (2013.01); *B65D 2203/02* (2013.01); *C08J 2367/02* (2013.01); *C08J 2467/02* (2013.01)

(58) Field of Classification Search
None
See application file for complete search history.

(56) References Cited

U.S. PATENT DOCUMENTS

| | | |
|---|---|---|
| 2013/0008821 A1 | 1/2013 | Haruta et al. |
| 2015/0014202 A1 | 1/2015 | Haruta et al. |
| 2016/0090456 A1 | 3/2016 | Ishimaru et al. |

FOREIGN PATENT DOCUMENTS

| | | | | |
|---|---|---|---|---|
| CN | 104271333 A | * | 1/2015 | ................ C08J 5/18 |
| EP | 2548913 A1 | | 1/2013 | |
| EP | 2792469 A1 | * | 10/2014 | .......... B29C 61/003 |
| JP | 2003-012831 A | | 1/2003 | |
| JP | 5240387 B1 | | 7/2013 | |
| WO | WO 2014/185442 A1 | | 11/2014 | |

OTHER PUBLICATIONS

Japanese Patent Office, International Search Report in International Patent Application No. PCT/JP2016/078707 (dated Nov. 22, 2016).
China National Intellectual Property Administration, Notification of First Office Action in Chinese Patent Application No. 201680055751.0 (dated Sep. 9, 2019).
European Patent Office, Extended European Search Report in European Patent Application No. 16851677.1 (dated May 9, 2019).
Taiwan Intellectual Property Office, First Office Action in Taiwanese Patent Application No. 105131663 (dated Feb. 14, 2020).

* cited by examiner

*Primary Examiner* — Laura C Powers
(74) *Attorney, Agent, or Firm* — Leydig, Voit & Mayer, Ltd.

(57) ABSTRACT

The inventive label is prepared from a polyester with an intrinsic viscosity of 0.58 dl/g or more. The label has a base film with a thickness of 8-30 μm and a difference in specific heat capacity ΔCp between temperatures lower and higher than Tg of 0.2 J/(g·° C.) or more. The label has a tensile elongation at break of 5% or more in both a main shrinkage direction and an orthogonal direction. A difference between the absorbancy ratio (absorbancy at 1340 $cm^{-1}$/absorbancy at 1410 $cm^{-1}$) in the main shrinkage direction of the label and the absorbancy ratio in the direction orthogonal to the main shrinkage direction of the label is 0.2 or more. The label has a difference between a maximum value and a minimum value of a length in a vertical direction of the label of 3 mm or less.

12 Claims, No Drawings

POLYESTER LABEL AND PACKAGING CONTAINER

CROSS-REFERENCE TO RELATED APPLICATIONS

This patent application is the U.S. national phase of International Patent Application No. PCT/JP2016/078707, filed Sep. 28, 2016, which claims the benefit of Japanese Patent Application No. 2015-195298, filed on Sep. 30, 2015, which are incorporated by reference in their entireties herein.

TECHNICAL FIELD

The present invention relates to a polyester label after heat-shrinking a heat-shrinkable polyester film, and a packaging container covered with this label.

BACKGROUND ART

Recently, in applications such as label package doubling as a protection of a glass bottle and a plastic bottle, etc. and display of articles, cap sealing and accumulation package, there has been widely used, as a shrink label, a polyester-based heat-shrinkable film which is high in heat resistance, easy to incinerate, and excellent in solvent resistance. The use amount of the polyester-based heat-shrinkable film tends to increase being accompanied by an increase in volume of beverages in PET (polyethylene terephthalate) bottle containers.

Heretofore, a heat-shrinkable film with a thickness of 40 to 60 μm has been used as a heat-shrinkable label for covering a PET bottle (for example, Patent Document 1). However, heat-shrinkable films used for packaging become mere garbage after using the contents. Given this situation, in response to the growing environmental awareness of reducing garbage as much as possible, film manufacturers are also examining a reduction of the thickness of a heat-shrinkable polyester film.

However, when the thickness of the heat-shrinkable label is reduced, the thickness of the label after heat shrinkage (hereinafter, when simply referred to as a label, the label means a label after heat shrinkage) may be also reduced, whereby when products covered with the labels are transported by truck, cracking and tearing (so-called cracks) of the labels may occur due to the contact between the products. A general heat-shrinkable film has a high tensile strength at break in the main shrinkage direction but has a low tensile strength at break in a direction orthogonal to the shrinkage direction, and hence, in the label having a reduced thickness, cracks are more likely to occur due to shaking or vibration, and the contact between the products during transport.

On the other hand, in the invention described in Patent Document 2, since the heat-shrinkable polyester film has a high tensile strength at break in both the longitudinal direction and the width direction, the label even having a decreased thickness has strength, and therefore, the frequency of occurrence of cracks or the like during transport is presumed to be low. However, as compared with a general production method of a heat-shrinkable film, the production method of Patent Document 2 is very complicated and requires large production equipment, resulting in high initial investment cost.

PRIOR ART DOCUMENT

Patent Documents

Patent Document 1: JP 2003-12831A
Patent Document 2: JP 5240387 (B1)

SUMMARY OF THE INVENTION

Problems to be Solved by the Invention

Under such circumstances, an object of the present invention is to provide a label in which the frequency of occurrence of cracks is low even if the label uses a film having a small thickness and a relatively low strength.

Means for Solving the Problem

The present invention which could solve the above problems satisfies the following requirements (1) to (6):
(1) the label comprises a base film having a thickness of 8 μm or more and 30 μm or less:
(2) a polyester constituting the label has an intrinsic viscosity of 0.58 dl/g or more:
(3) the label has a tensile elongation at break of 5% or more in both a main shrinkage direction of the label and a direction orthogonal to the main shrinkage direction of the label:
(4) when an absorbancy at 1340 $cm^{-1}$ and an absorbancy at 1410 $cm^{-1}$ are measured for the base film constituting the label by a polarized ATR method, a difference between an absorbancy ratio (absorbancy at 1340 $cm^{-1}$/absorbancy at 1410 $cm^{-1}$) in the main shrinkage direction of the label and an absorbancy ratio (absorbancy at 1340 $cm^{-1}$/absorbancy at 1410 $cm^{-1}$) in the direction orthogonal to the main shrinkage direction of the label is 0.2 or more:
(5) when a reversible heat capacity curve is measured for the base film constituting the label with a temperature modulated differential scanning calorimeter, the base film constituting the label has a difference in specific heat capacity ΔCp between at a lower and a higher temperature than Tg of 0.2 J/(g·° C.) or more: and
(6) the label has a difference between a maximum value and a minimum value of a length in a vertical direction of the label of 3 mm or less.

The polyester label has preferably a tensile strength at break in the direction orthogonal to the main shrinkage direction of the label of 5 MPa or more and 60 MPa or less.

The polyester constituting the label has preferably 5 mol % or more and 15 mol % or less of a unit derived from propanediol in 100 mol % of constituent units of the polyester.

The present invention involves a package container having the label on at least a part of the outer periphery of the container.

Effects of the Invention

The label of the present invention can meet the needs for reduction in thickness and suppress the occurrence of cracks during transport.

MODE FOR CARRYING OUT THE INVENTION

The label of the present invention is a label after heat shrinking a tube-like heat-shrinkable polyester label with which a PET bottle is covered, the tube-like heat-shrinkable polyester label being formed by stacking both end parts of a heat-shrinkable polyester film and bonding them together using an organic solvent. Here, the end parts mean end parts in the width direction (that is a direction along the longitudinal direction).

The above heat-shrinkable polyester film includes not only a film composed of a single polyester layer but also a laminated film having a multilayer structure such as polyester/resin other than polyester/polyester (it may be composed of 5 or more layers) in which the outer layers are formed from polyester.

The polyester used in the heat-shrinkable polyester film is preferably a polyester containing an ethylene terephthalate unit as a main constituent. Because it is excellent in heat resistance and strength. The content of the ethylene terephthalate unit is preferably 50 mol % or more, more preferably 60 mol % or more, and further preferably 70 mol % or more in 100 mol % of the constituent units of the polyester.

Other dicarboxylic acid components constituting the polyester of the present invention can include aromatic dicarboxylic acids such as isophthalic acid, ortho-phthalic acid, and 2,6-naphthalenedicarboxylic acid; aliphatic dicarboxylic acids such as adipic acid, azelaic acid, sebacic acid and decanedicarboxylic acid; and alicyclic dicarboxylic acid such as 1,4-cyclohexanedicarboxylic acid; or the like.

Further, it is preferable not to contain polybasic carboxylic acids of tribasic or more (for example, trimellitic acid, pyromellitic acid and anhydride thereof etc.) in the polyester. A heat-shrinkable polyester film obtained by using a polyester containing these polybasic carboxylic acids is hard to achieve a necessary high shrinkage.

Diol components constituting the polyester include aliphatic diols such as ethylene glycol, 1,3-propanediol, 2,2-dietyl-1,3-propanediol, 2-n-butyl-2-ethyl-1,3-propanediol, 2,2-isopropyl-1,3-propanediol, 2,2-di-n-butyl-1,3-propanediol, 1,4-butanediol, hexanediol, and neopentyl glycol; alicyclic diols such as 1,4-cyclohexanedimethanol; and aromatic diols such as bisphenol A.

Of these, alicyclic diols such as 1,4-cyclohexanedimethanol and diols having 3 to 6 carbon atoms (for example, 1,3-propanediol, 1,4-butanediol, neopentyl glycol, hexanediol, etc.) are preferably used. In particular, when 1,3-propanediol is used, a polyester which satisfies the above-mentioned requirements (1) to (6) for the present invention can be easily obtained.

In the present invention, the reason why use of 1,3-propanediol is preferred is as follows. Generally, when lengthwise drawing is carried out to increase the tensile strength at break in the longitudinal direction of a heat-shrinkable polyester film, the heat shrinkage in the longitudinal direction is usually increased, leading to a defect such as vertical shrinkage deterioration. Here, the term "vertical shrinkage deterioration" means that when a label with which a bottle is covered is allowed to heat-shrink, the edges of the label curve (for example, the upper edge curves downward and the lower edge curves upward), resulting in poor appearance. That is, it means a phenomenon that the label length in the vertical direction (height direction) of the bottle becomes short. In Patent Document 2 described above, in order to suppress such a defect, it is necessary to conduct an intermediate heat treatment after lengthwise drawing and conduct a relaxation treatment in the longitudinal direction after lengthwise drawing, at the time of intermediate heat treatment, and at the time of final heat treatment, whereby the production method becomes complicated.

However, the present inventors have studied and then found out that when 1,3-propanediol is used as a diol component, the heat shrinkage in the longitudinal direction is kept low even without conducting the intermediate heat treatment and the relaxation treatment in the longitudinal direction after lengthwise drawing. Although the reason therefor is not clear, it is assumed that when polyester is drawn, the formation of crystal structure in the molecular orientation is suppressed due to the straight-chain structure of 1,3-propanediol.

It is preferable that a polyester constituting the label contain 5 mol % or more and 15 mol % or less of a unit derived from propanediol in 100 mol % of the constituent units of the polyester. When it is less than 5 mol %, the heat shrinkage in the longitudinal direction becomes high, leading to a defect such as vertical shrinkage deterioration when the label with which a bottle is covered is allowed to heat-shrink. The content of the unit derived from propanediol is preferably 6 mol % or more, more preferably 8 mol % or more, and particularly preferably 10 mol % or more. The upper limit of the content of the unit derived from propanediol is not particularly limited, but it is preferably about 15 mol % because the cost of raw materials increases when the content of the unit derived from propanediol increases.

Further, the polyester has 17% or more of the sum of at least one monomer component that can form an amorphous component in 100 mol % of a polyhydric alcohol component or in 100 mol % of a polybasic carboxylic acid component in the whole polyester resin, preferably 18% or more, more preferably 19% or more, and particularly preferably 20% or more. In addition, the upper limit of the total amount of monomer components that can form an amorphous component is not particularly limited, but is preferably 30 mol %. When the amount of amorphous components is set within the above-mentioned range, a polyester having a glass transition point (Tg) being adjusted to 60 to 80° C. is obtained.

Examples of the monomer that can form an amorphous component may include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. Among these, neopentyl glycol, 1,4-cyclohexanedimethanol, or isophthalic acid is preferably used.

In the polyester constituting the label, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester label obtained by using a polyester containing these diols or these polyhydric alcohols is hard to achieve a necessary high shrinkage. Furthermore, in the polyester constituting the label, it is also preferable not to contain diethylene glycol, triethylene glycol, or polyethylene glycol as far as possible.

To a resin for forming the heat-shrinkable polyester film to be used for the label of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin constituting the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 µm (when measured by coulter counter), and it can be suitably selected according to need.

As a method for compounding the above-described fine particles in a resin for forming the heat-shrinkable polyester film, for example, they can be added in an arbitrary step in production of the polyester resin, but they are preferably added in a step of esterification, or in a step after completion of ester exchange reaction and before start of polycondensation reaction as slurry dispersed in ethylene glycol etc., followed by carrying out polycondensation reaction. Further, it is also preferably carried out by a method in which slurry of fine particles dispersed in ethylene glycol, water or the like and raw materials of polyester resin are mixed using a kneading extruder with a vent, or a method in which dried fine particles and raw materials of polyester resin are mixed using a kneading extruder.

It is also possible to conduct corona treatment, coating treatment, frame treatment etc. on the above heat-shrinkable polyester film in order to enhance adhesiveness of film surface.

The above-mentioned heat-shrinkable polyester film may also include a laminated polyester film having at least one polyester resin layer. When two or more polyester resin layers are laminated, the respective polyester resin layers may be composed of polyesters having the same composition or different compositions.

A layer that can be laminated as other layers than the polyester is not particularly limited as long as it is a thermoplastic resin layer, but it is preferably a polystyrene resin layer in view of prices and heat shrinkage properties. The other layers may be either a single layer or two or more layers.

The polystyrene resins usable in the present invention include homopolymers and copolymers of styrene, and styrene derivatives such as α-methylstyrene, p-methylstyrene; copolymers of styrene or styrene derivatives and other monomers copolymerizable such as acrylic acid, methacrylic acid, their metal salts (e.g., Na, K, Li, Mg, Ca, Zn and Fe), aliphatic unsaturated carboxylic acids such as acrylic acid esters and methacrylic acid esters, and their derivatives; and block copolymers of styrene or styrene derivatives and butadiene or the like. Among these, polystyrene, styrene-butyl acrylate copolymer, styrene-butadiene block copolymer or the like are preferable. For the purpose of lowering a heat shrinkage initiating temperature and improving impact resistance, a plasticizer, a compatibilizer or the like may be blended in the polystyrene resin.

It is preferable to add a thermoplastic resin and/or a rubber component to the polystyrene resin. As examples of the thermoplastic resin, styrene resins such as polystyrene having an atactic structure, AS resin, and ABS resin, polyester resins such as polyethylene terephthalate, polyethylene naphthalate, and polybutylene terephthalate, polyamide resins such as nylon 6, nylon 66, nylon 12, nylon 4, and polyhexamethylene adipamide, polyolefin resins such as polyethylene, polypropylene and polybutene, and the like can be given.

As the rubber component, a rubbery copolymer containing a styrene compound as a constituent component is preferable, and a random, block or graft copolymer formed by copolymerization of one or more selected from styrenes and one or more selected from rubber components can be given. Examples of such rubbery copolymer include styrene-butadiene copolymer rubber, styrene-isoprene block copolymer, rubber obtained by hydrogenating part or all of their butadiene portions, methyl acrylate-butadiene-styrene copolymer rubber, acrylonitrile-butadiene-styrene copolymer rubber, acrylonitrile-alkyl acrylate-butadiene-styrene copolymer rubber, methyl methacrylate-alkyl acrylate-butadiene-styrene copolymer rubber, and the like. Since the above-mentioned rubbery copolymers containing a styrene compound as a constituent component have a styrene unit, they have good dispersibility in a polystyrene resin having a syndiotactic structure and a large effect of improving plasticity of the polystyrene resin. As a compatibility adjusting agent, the above-mentioned rubbery copolymers containing a styrene compound as a constituent component can be suitably used.

As the rubber component, in addition, natural rubber, polybutadiene, polyisoprene, polyisobutylene, neoprene, ethylene-propylene copolymer rubber, urethane rubber, silicone rubber, acrylic rubber, polyether-ester rubber, polyester-ester rubber, and the like can be used.

The weight average molecular weight of the polystyrene resin is preferably 10,000 or more, and more preferably 50,000 or more. If the weight average molecular weight is less than 10,000, the strength maintaining properties and heat resistance of the film are unfavorably liable to deteriorate. The upper limit of the weight average molecular weight is not particularly limited, but if the weight average molecular weight exceeds 1,500,000, breakage or the like associated with increase in drawing tension may unfavorably occur.

Polystyrene resins of various grades are commercially available from various manufacturers, and a commercially available polystyrene resin may be used.

Next, the properties of the label of the present invention will be described. The label of the present invention is a label obtained by allowing a heat-shrinkable polyester film to heat-shrink. Heat shrinkage is usually conducted in a state that the heat-shrinkable label (label before heat shrinkage) is mounted to a bottle. In the label of the present invention, the label comprises a base film has a thickness of 8 µm or more and 30 µm or less. The thickness of the base film needs to be within this range since the present invention aims at a label having a reduced thickness. The thickness of the base film in the label is more preferably 9 µm or more and 28 µm or less, further preferably 10 µm or more and 26 µm or less, and particularly preferably 20 µm or less.

The polyester constituting the label of the present invention has an intrinsic viscosity of 0.58 dl/g or more. When the intrinsic viscosity of the label is 0.58 dl/g or more, the tensile elongation at break of the label also increases, and hence, the frequency of occurrence of cracks becomes low. The intrinsic viscosity of the label is more preferably 0.60 dl/g or more, and further preferably 0.61 dl/g or more. Although a higher intrinsic viscosity is preferable, if it is too high, a load applied on a raw material extruder or the like increases during the production of films, and hence the upper limit thereof is 0.9 dl/g.

The label of the present invention has a tensile elongation at break of 5% or more in both the main shrinkage direction and the direction orthogonal to the main shrinkage direction. When the tensile elongation at break of the label is high, the frequency of occurrence of cracks becomes low. The tensile elongation at break in the main shrinkage direction of the label is more preferably 15% or more, and further preferably 25% or more. Although a higher tensile elongation at break is preferable, the upper limit thereof is 50% considering that the heat-shrinkable label is susceptible to solvent-attack at the time of the production and that the characteristics of the heat-shrinkable label are more likely to change during long-term storage. The label of the present invention is a label after heat shrinkage, but still has a heat-shrinking capacity. For example, when a label with which a bottle is covered is peeled off and immersed in warm water of about 80° C., the label heat-shrinks. Therefore, it can be seen that the shrinkage direction at this time is a main shrinkage direction. For the same reason, the tensile elongation at break in the direction orthogonal to the main shrinkage direction of the label is more preferably 6% or more, and further preferably 7% or more. The upper limit thereof is about 20% for the same reason as above.

In the label of the present invention, when an absorbancy at 1340 $cm^{-1}$ and an absorbancy at 1410 $cm^{-1}$ are measured for the base film constituting the label by a polarized ATR method, the difference between an absorbancy ratio (absorbancy at 1340 $cm^{-1}$/absorbancy at 1410 $cm^{-1}$) in the main shrinkage direction of the label and an absorbancy ratio (absorbancy at 1340 $cm^{-1}$/absorbancy at 1410 $cm^{-1}$) in the direction orthogonal to the main shrinkage direction of the label is 0.2 or more. If the difference is less than 0.2, it is inevitable to carry out the complicated production method described in Patent Document 2 in order to prevent poor appearance such as vertical shrinkage deterioration. The above-mentioned difference is more preferably 0.22 or more, and further preferably 0.24 or more. The above-mentioned absorbancy ratio represents a trans conformation ratio of molecular orientation. It is considered that the trans conformation represents the degree of entanglement of molecular chains, and when the trans conformation ratio is high, the degree of entanglement of molecular chains is also high. Therefore, a small difference between the absorbancy ratio in the main shrinkage direction and the absorbancy ratio in the direction orthogonal to the main shrinkage direction means that the shrinkage in the longitudinal direction is close to the shrinkage in the width direction. Incidentally, since the polarized ATR method is a method for analyzing the molecular orientation of a sample surface (about several m in depth), in the case of the laminated polyester film, the absorbancy ratio of the outermost polyester layer is within the above numerical range. The measurement method of the absorbancy ratio will be described later. Furthermore, the base film constituting the label means that a printing layer and layers other than the heat-shrinkable film are excluded.

In the label of the present invention, when a reversible heat capacity curve is measured for the base film constituting the label with a temperature modulated differential scanning calorimeter, a difference in specific heat capacity ΔCp (equivalent to a mobile amorphous amount) between at a lower and a higher temperature than Tg needs to be 0.2 J/(g·° C.) or more. With regard to a label sample, when a reversible heat capacity curve is measured with a temperature modulated differential scanning calorimeter, the baseline is shifted at a temperature equivalent to Tg. The difference of the values between before and after shifting is referred to as a difference in specific heat capacity ΔCp and is supposed to be equivalent to the mobile amorphous amount. The mobile amorphous is amorphous in which molecular chains begin to move around Tg, and can be distinguished from rigid amorphous in which molecular chains do not move until the temperature becomes higher than Tg. The present inventors have found that the mobile amorphous amount influences heat shrinkage. It is important that the mobile amorphous is not converted to rigid amorphous as much as possible or most of the rigid amorphous is converted to mobile amorphous in order to obtain a film having a high heat shrinkage and difficult to shrink in the longitudinal direction. If the ΔCp is smaller than 0.2 J/(g·° C.), the mobile amorphous amount is small, and hence it is considered that the label is easily adversely affected by solvent-attack when formed into a heat-shrinkable label, and the label may significantly deteriorate due to long-term storage after being formed into a heat-shrinkable label. If the label significantly deteriorates, the label after heat shrinkage becomes brittle, and cracks easily occur. The ΔCp is more preferably 0.23 J/(g·° C.) or more, and further preferably 0.26 J/(g·° C.) or more. Although the upper limit thereof is not particularly limited from the above viewpoint, it is generally about 0.6 J/(g·° C.) considering an increase in the natural shrinkage of the base film constituting the heat-shrinkable label.

In the label of the present invention, the difference between the maximum value and the minimum value of the length in the vertical direction (height direction) of the label is 3 mm or less. The length of the label is a length in the vertical direction of the label in a state in which a bottle is covered with the label. If vertical shrinkage deterioration occurs in the label, the difference between the maximum value and the minimum value of the length in the vertical direction of the label may exceed 3 mm, which means that poor appearance occurs in the label. Therefore, in the label of the present invention, the difference between the maximum value and the minimum value of the length in the vertical direction is 3 mm or less. The difference between the maximum value and the minimum value of the length in the vertical direction of the label is preferably 2 mm or less, and more preferably 1 mm or less.

In the label of the present invention, the tensile strength at break in the direction orthogonal to the main shrinkage direction is preferably 5 MPa or more and 60 MPa or less. If it is less than 5 MPa, cracks easily occur due to insufficient strength of the label. The tensile strength at break in the direction orthogonal to the main shrinkage direction is more preferably 7 MPa or more, and further preferably 9 MPa or more. Although a higher tensile strength at break is preferable, the upper limit thereof is 60 MPa since the conduct of a complicated production method described in Patent Document 2 becomes inevitable.

The heat-shrinkable polyester film to be use for the present invention can be obtained, for example, by melt-extruding the above-mentioned polyester raw material with an extruder to form an undrawn film and by drawing the undrawn film and subjecting it to heat treatment by a predetermined described below. In the case of laminating layers, a plurality of extruders, feed blocks, or multi-manifolds may be used. Incidentally, a polyester can be obtained by allowing the suitable dicarboxylic acid component and diol component mentioned above to undergo a polycondensation by a known method. Moreover, usually, two or more kinds of chip-like polyesters are used by mixing as raw materials for a film.

A specific method for producing the film and the label is as follows. Raw material chips are dried using a dryer such as a hopper dryer and a paddle dryer, or a vacuum dryer and extruded into a film form at a temperature of 200 to 280° C. Alternatively, un-dried polyester raw materials are similarly extruded into a film form while removing moisture in a bent-type extruder. In such an extrusion, any conventional methods such as a T-die method and a tubular method can be adopted. The temperature during extrusion is controlled not to exceed 280° C. If the melting temperature is too high, it is not preferable because the intrinsic viscosity of a label obtained decreases and cracks easily occur in the label. After extrusion, the molten resin is quenched to obtain an undrawn film. This "undrawn film" may include a film to which a tension necessary for film feeding is applied. As a method for quenching the molten resin, a method in which the molten resin is cast on a rotary drum from a die and solidified by quenching to obtain a substantially unoriented resin sheet can be suitably adopted.

This undrawn film is subjected to a drawing treatment. The drawing treatment may be conducted continuously after cooling by a casting roll or the like as described above, or the film is once wound as a roll after cooling, and then the drawing treatment may be carried out.

Since it is practical from the viewpoint of production efficiency that the film has the main shrinkage direction in the transverse (width) direction, an example of a drawing method of the case where the main shrinkage direction is the transverse direction of the film will be shown below. In the case where the film has the main shrinkage direction in the lengthwise (longitudinal) direction, the film can be also drawn according to a usual operation such as changing the drawing direction of the following method by 90 degrees.

First, the undrawn film obtained above is heated at 70 to 100° C., preferably at 80 to 90° C. on a roll as necessary, and then drawn in the lengthwise direction in the range of from 1.1 to 1.8 times using the difference in rotation speed between the rolls. The lengthwise drawn film thus obtained is preheated at 80 to 120° C., preferably at 90 to 110° C. as necessary, and then drawn in the transverse direction (a direction orthogonal to the extruding direction) by a tenter or the like by 3.0 times or more, preferably 3.5 times or more and 7 times or less. The drawing temperature is 65° C. or higher and 100° C. or lower, preferably 70° C. or higher and 95° C. or lower.

After transverse drawing, a heat treatment is preferably performed at a temperature P° C. to 30° C. higher than the drawing temperature. The heat treatment is performed to relax a tension of the film after drawing, and a heat shrinkage is adjusted by a temperature of the heat treatment. The heat treatment is also effective to reduce the natural shrinkage. However, as a disadvantage of the heat treatment, there is a problem that if the film after drawing is heated in the heat treatment zone, a bowing phenomenon occurs and the physical properties in the width direction are deteriorated (reference document: Seikei-kakou, 4(5), 312(1992)). As a result, a heat-shrinkable polyester film to be formed into the label of the present invention is obtained.

The above-mentioned heat-shrinkable polyester film can be formed into a heat-shrinkable label by a known method. Specifically, a heat-shrinkable polyester film cut to a desired width is subjected to an appropriate printing, and the left and right end parts of the film are stacked and bonded by solvent bonding or the like to produce a tube film. The tube film is cut to an appropriate length to obtain a tube-like label. As an organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

After providing perforations on the above label by a known method, a PET bottle is covered with the label, and the PET bottle with the label is put on a conveyor belt or the like and passed through a shrinkage tunnel for blowing steam (steam tunnel) or a shrinkage tunnel for blowing hot air (hot air tunnel). At the time of passing through the tunnel, the label heat-shrinks, whereby the label after heat shrinkage is mounted to a bottle container such as a PET bottle. The label of the present invention is a label after heat shrinkage thus obtained.

The object to be packaged can be exemplified by PET bottles for beverage, various kinds of bottles, cans, plastic containers for confectionary, a box lunch and the like, paper-made boxes, and the like. In general, in the case where a label obtained by using a heat-shrinkable polyester film is covered on the packaging object and heat-shrunk, the label is heat-shrunk by about 5 to 70% and closely attached on the package. The label to be coated on the object to be packaged may be printed or may not be printed. The present invention involves a package container having the label on at least a part of the outer periphery of the container.

This application claims the benefit of priority to Japanese Patent Application No. 2015-195298, filed on Sep. 30, 2015. The entire contents of the specifications of Japanese Patent Application No. 2015-195298, filed on Sep. 30, 2015 are incorporated herein by reference.

EXAMPLES

Hereinafter, the present invention is described in more detail by Examples, but the present invention is by no means limited to aspects of the Examples, and it can be suitably modified in the range not departing from the scope of the present invention. The methods for measuring the physical properties of the films and labels obtained in the following Examples and Comparative Examples are as follows.

[Heat Shrinkage (Hot-Water Heat Shrinkage)]

A heat-shrinkable polyester film was cut along the longitudinal direction and the direction orthogonal thereto (the width direction) to obtain a square sample of 10 cm×10 cm, and the sample was dipped in hot water of 90° C.±0.5° C. in no load state for 10 seconds to be heat-shrunk, then immediately dipped in water of 25° C.±0.5° C. for 10 seconds, and taken from water. Then, the lengths in the lengthwise and transverse directions of the sample were measured. Heat shrinkage was obtained according to the following equation.

Heat shrinkage (%)={(length before shrinkage− length after shrinkage)/length before shrinkage}

In this example, the direction with the largest shrinkage of the film (main shrinkage direction) is the width direction.

[Difference in Specific Heat Capacity ΔCp Between at a Lower and a Higher Temperature than Tg]

A heat-shrinkable polyester film or a label after heat shrinkage was weighed 10.0±0.2 mg as a sample in a hermetic aluminum pan using a temperature modulated differential scanning calorimeter (DSC, "Q100" manufactured by TA Instruments), and the weighed sample was measured under the conditions of the MDSC (registered trademark) heat only mode, an average heating-up speed of 1.0° C./min, and a modulation cycle of 40 seconds to obtain a reversible heat capacity curve. In the obtained heat capacity curve, an inflection point was determined using the supplied analysis software (TA Analysis manufactured by TA Instruments), and the difference in heat capacity between before and behind the inflection point (glass transition temperature; Tg) was calculated according to the following equation, and the calculated value was defined as a difference in reversible heat capacity ΔCp (J/(g·° C.)). Here, the above-mentioned inflection point means a point where a value obtained by differentiating the reversible heat capacity curve twice is zero when the reversible heat capacity curve is an ideal curve without irregularities.

Difference in reversible heat capacity ΔCp (J/(g·° C.))=(Heat capacity on a higher temperature side than Tg)−(Heat capacity on a lower temperature side than Tg)

In the heat capacity curve, an extension line of the baseline of the heat capacity curve on a higher temperature side than Tg is drawn. A line found by performing linear fitting of the baseline of the heat capacity curve in the range of from Tg+5° C. to Tg+15° C. with the least-square method is defined as an extension line of the baseline of the heat capacity curve on the higher temperature side than Tg. Then, the intersection with a tangent at the inflection point (Tg) is determined, and the value of Y axis (reversible heat capacity) at this intersection is read and taken as a heat capacity on the higher temperature side. Next, a line found by performing linear fitting of the baseline of the heat capacity curve in the range of from Tg−15° C. to Tg−5° C. with the least-square method is defined as an extension line of the baseline of the heat capacity curve on the lower temperature side than Tg. Then, the intersection with a tangent at the inflection point (Tg) is determined, and the value of Y axis (reversible heat capacity) at this intersection is read and taken as a heat capacity on the lower temperature side. Thus, the difference between the heat capacity on the higher temperature side and the heat capacity on the lower temperature side was taken as the heat capacity difference ΔCp (J/(g·° C.)).

For a heat-shrinkable polyester film or a label after heat shrinkage, a ratio of an absorbancy at 1340 cm$^{-1}$ to an absorbancy at 1410 cm$^{-1}$ (absorbancy at 1340 cm$^{-1}$/absorbancy at 1410 cm$^{-1}$) was determined by the polarized ATR method. Specifically, using an FT-IR spectrometer ("FTS 60A/896" manufactured by Varian Inc.), the measurement was performed by utilizing the absorption band of infrared absorption spectrum with polarized light under the conditions of a measurement wavenumber region of 650 to 4000 cm$^{-1}$ and a cumulative number of 128 times by the ATR method. The difference was calculated from the obtained absorbancy ratios according to the following equation, and was taken as a difference in absorbancy ratio.

Difference in absorbancy ratio=absorbancy ratio in the main shrinkage direction of the label−absorbancy ratio in the direction orthogonal to the main shrinkage direction of the label

[Tensile Strength at Break and Tensile Elongation at Break]

A test specimen with a strip-like shape of 140 mm in the measurement direction and 20 mm in the direction orthogonal to the measurement direction was prepared. Using a universal tensile testing machine "DSS-100" (manufactured by SHIMADZU CORPORATION), each of 20 mm grasping margins located at both ends of the test specimen was fixed to a chuck (the distance between chucks of 100 mm), and the tensile test was performed under the conditions of an atmospheric temperature of 23° C. and a tensile speed of 200 mm/minute. The strength (stress) and the elongation at the time of being torn and broken were defined as a tensile strength at break (MPa) and a tensile elongation at break (%), respectively.

[Intrinsic Viscosity]

0.1 g of raw material chips or 0.1 g of a label precisely weighed was dissolved in 25 ml of a solvent mixture of phenol/tetrachloroethane=3/2 (mass ratio), and the intrinsic viscosity of the resulting mixture was measured at 30±0.1° C. using an Ostwald viscometer. The intrinsic viscosity [η] is obtained by the following equation (the Huggins equation).

$$[\eta] = \lim_{C \to 0} \frac{\eta_{sp}}{C} \quad \text{[Formula 1]}$$

$$\frac{\eta_{sp}}{C} = [\eta] + k[\eta]^2 C$$

$$\eta_{sp} = \frac{t - t_0}{t_0}$$

Here, ηsp is the specific viscosity, t 0 is the fall time of the solvent using the Ostwald viscometer, t is the falling time of the chip (or label) solution using the Ostwald viscometer, and C is the concentration of the chip (or label) solution. In the actual measurement, the intrinsic viscosity was calculated by the following approximate equation with k=0.375 in the Huggins equation.

$$\eta_r = \eta_{sp} + 1 = \frac{t}{t_0} \quad \text{[Formula 2]}$$

$$[\eta] = \frac{1}{1.6}\{(\eta_r - 1) + 3 \times \ln\eta_r\}$$

[Method for Preparing Heat-Shrinkable Label]

Each of the film rolls produced in the following Examples and Comparative Examples was slit to a width of about 242 mm, and the film was divided into a prescribed length and wound up to produce a small slit roll. On this slit roll, a printing (three color-printing) for label with green, gold and white inks of Toyo Ink Mfg Co., Ltd. was provided repeatedly. For each label, two lines of perforations (perforations formed by aligning holes of about 1 mm diameter at intervals of about 4 mm) along the entire length of the film in the longitudinal direction of the film were formed in parallel at a spacing of about 22 mm. By bonding both end parts of the heat-shrinkable film with dioxolane, a cylindrical heat-shrinkable label (a label in which the main shrinkage direction of the heat-shrinkable film was set to the circumferential direction) was prepared. Then, the cylindrical heat-shrinkable label was cut at a pitch of 210 mm in the longitudinal direction to obtain a heat-shrinkable label. A rectangular-shaped PET bottle having a capacity of 500 ml (the trunk having a square cross section of 55 mm per side and the smallest part of the neck part having a square cross section of 25 mm per side) was covered with this label, and by allowing the label to shrink by heat at a zone temperature of 80° C. with a passing time of 2.5 seconds using a steam tunnel (model type; SH-1500-L) manufactured by Fuji Astec Inc., the label was mounted to the bottle. In this connection, the label was mounted to the bottle such that a square part of 31 mm per side in the neck part of the bottle was located at the top end of the label.

[Aging of Label (after Heat Shrinkage)]

24 PET bottles to which the labels had been mounted were packed in each of cardboard boxes, and the cardboard boxes were kept for 60 days in an environmental test room set at 45° C. assuming storage in a warehouse in the summer.

[Measurement of Physical Properties of Label (after Heat Shrinkage)]

The physical properties of the label which was in contact with the trunk of the PET bottle after aging were measured. In Example 5, the physical properties of the outer polyester layer of the label were measured. The printing was wiped off with a cloth impregnated with methyl ethyl ketone and removed from the label.

[Strains of Label (after Heat Shrinkage)]

As finishing properties after shrinkage, whether strain, namely, vertical shrinkage deterioration was generated or not in the label was evaluated. Specifically, a length in the vertical direction of the label was measured, and a case where the difference between the maximum value and the minimum value of the length was 3 mm or less was evaluated as good (○), and a case where the difference between the maximum value and the minimum value of the length was more than 3 mm was evaluated as poor (x).

[Presence or Absence of Occurrence of Cracks]

Three cardboard boxes in which the PET bottles after aging were packed as described above were placed on a cargo bed of a truck, and the truck was driven so that the traveling time was 48 hours or longer in total. Then, the PET bottles were taken out from the cardboard boxes and visually checked for presence or absence of cracks in the labels. A case where even one bottle of the 72 PET bottles had cracks was evaluated as poor (x), and a case where all PET bottles had no crack at all was evaluated as good (○).

Preparation of Polyester Raw Material

Synthetic Example 1 (Synthesis of Polyester)

57036 parts by mass of terephthalic acid (TPA), 33244 parts by mass of ethylene glycol (EG), 15733 parts by mass of neopentyl glycol (NPG), 23.2 parts by mass of antimony trioxide as a polycondensation catalyst, 5.0 parts by mass of sodium acetate (alkali metal compound), and 46.1 parts by mass of trimethyl phosphate (phosphorus compound) were placed in an esterification reaction can, the pressure was adjusted to 0.25 MPa, and the mixture was subjected to an esterification reaction by stirring at 220 to 240° C. for 120 minutes. The pressure in the reaction can was returned to ambient pressure, 3.0 parts by mass of cobalt acetate tetrahydrate and 124.1 parts by mass of magnesium acetate tetrahydrate were added thereto, and after stirring at 240° C. for 10 minutes, the pressure was reduced to 1.33 hPa over 75 minutes and the temperature was raised to 280° C. The reaction mixture was continuously stirred (for about 70 minutes) at 280° C. until the melt viscosity reached 4500 poise, and then discharged into water in the form of a strand. The discharged product was cut by a strand cutter to obtain chip B. The intrinsic viscosity of the chip B was 0.75 dl/g.

Synthetic Example 2

Chips A and C having the compositions shown in Table 1 were prepared in the same manner as that in Synthetic Example 1. In the Table, "DEG" is an abbreviation of diethylene glycol, and "PD" is an abbreviation of 1,3-propanediol. To the chip A, $SiO_2$(Silysia 266, manufactured by FUJI SILYSIA CHEMICAL LTD.) was added as a lubricant at a proportion of 2,000 ppm relative to the polyester. The intrinsic viscosity of the chip A was 0.75 dl/g, and the intrinsic viscosity of the chip C was 0.92 dl/g.

TABLE 1

| | composition of polyester raw material (mol %) | | | | | addition amount of lubricant (ppm) |
|---|---|---|---|---|---|---|
| | dicarboxylic acid component | polyhydric alcohol component | | | | |
| | TPA | EG | NPG | DEG | PD | |
| chip A | 100 | 99 | — | 1 | — | 2000 |
| chip B | 100 | 69 | 30 | 1 | — | 0 |
| chip C | 100 | — | — | — | 100 | 0 |

In Table 2, the commercially available polystyrene resins used in Example 5 are shown. "CLEAREN" is a registered trademark of Denki Kagaku Kogyo Kabushiki Kaisha, and "TUFPRENE" is a registered trademark of Asahi Kasei Chemicals Corporation.

TABLE 2

| | contents of raw material chip | |
|---|---|---|
| | properties | manufacturer name of product |
| chip D | styrene-butyl acrylate copolymer | made by PS Japan Corporation SC004 |
| chip E | polystyrene | made by PS Japan Corporation HH203 |
| chip F | styrene-butadiene block copolymer | made by Denki Kagaku Kogyo Kabushiki Kaisha CLEAREN 530L |
| chip G | styrene-butadiene block copolymer | made by Asahi Kasei Chemicals Corporation TUFPRENE126 |

Example 1

<Method for Producing a Heat-Shrinkable Film>

The above-mentioned chips A, B and C were separately pre-dried, and 20 mass % of the chip A, 70 mass % of the chip B, and 10 mass % of the chip C were mixed as shown in Table 3 and introduced into an extruder. The mixed resin was molten at 260° C., extruded from a T-die and then quenched by contacting it with a rotating metal roll whose surface temperature was cooled to 30° C. to obtain an undrawn film with a thickness of 121 μm. The take-off speed (rotational speed of the metal roll) of the undrawn film at this time was about 20 m/min. Tg of the undrawn film was 73° C.

The above-mentioned undrawn film was introduced to a lengthwise drawing machine. The film was heated on a preheating roll of the lengthwise drawing machine until the surface temperature of the film reached 85° C., and then lengthwise drawn by 1.5 times using the difference in rotation speeds of the rolls. After lengthwise drawing, the film was cooled by a cooling roll whose surface temperature was set to 30° C.

The obtained undrawn film after lengthwise drawing was introduced to a tenter (transverse drawing machine). The preset temperature in a preheating process was set to 100° C., the preset temperature in a drawing process was set to 75° C., and the film was drawn in the width direction by 4.5 times. The film after transverse drawing was subjected to a heat treatment at 88° C. for 8 seconds in a tensioned state. Afterward, the film was cooled, both edge parts of the film were removed by cutting, and the film was wound as a roll with a width of 800 mm to continuously produce a drawn film with a thickness of 18 μm of a prescribed length. The resulting film and a label which was produced from the resulting film and then subjected to heat-shrinking and aging were evaluated for physical properties in the above-mentioned manner. The evaluation results are shown in Table 4. The properties results of the film are shown in Table 4A, and the properties results of the label after aging are shown in Table 4B (the same applies to the following). The label was a satisfactory label without the occurrence of cracks.

Example 2

A film with a thickness of 18 μm was produced in the same manner as that in Example 1 except that the melting temperature was raised to 280° C. The evaluation results are shown in Table 4. Although the intrinsic viscosity of the label slightly decreased due to aging compared with that of the film, the label was a satisfactory label without the occurrence of cracks.

Example 3

A film with a thickness of 18 μm was produced in the same manner as that in Example 1 except that the mass ratio of the chips A, B and C was changed to 30:60:10. The evaluation results are shown in Table 4. Although the difference in specific heat capacity ΔCp between at a lower and a higher temperature than Tg decreased due to aging compared with that of the film, the label was a satisfactory label without the occurrence of cracks.

Example 4

A film with a thickness of 9 μm was produced in the same manner as that in Example 1 except that the thickness of the undrawn film was changed to 60 μm. The evaluation results are shown in Table 4. The label was a satisfactory label without the occurrence of cracks.

Example 5

Using a co-extrusion method, a resin for forming a core layer, a resin for forming a skin layer, and a resin for forming an adhesive layer were melt-extruded from separate extruders (a first to a third extruders), stacked in a die (T-die), and quenched by winding the stacked resins around a rotating metal roll cooled to 30° C. by an air knife method to obtain an undrawn film (a polystyrene-based resin laminate sheet) with a thickness of 121 μm and having a three-kind five-layer structure, that is, a structure in which an intermediate layer (adhesive layer) was laminated on each of the front and back surfaces of a core layer, and a skin layer was laminated on the outside of each of those intermediate layers. The method for forming the layers of the undrawn film (including processes up to melt-extrusion) is as follows. In the following explanation, these layers are referred to as a first layer, a second layer, a third layer, a fourth layer, and a fifth layer in sequential order from the front side of the polystyrene-based resin laminate sheet (that is, the surface of the fifth layer is a contact surface with the metal roll). The take-off speed (rotational speed of the metal roll) of the undrawn film at this time was about 20 m/min.

Formation of the First and Fifth Layers (Skin Layers)

After pre-drying the above-mentioned chips A and B separately using a blender apparatus, 25 parts by mass of the pre-dried chip A, 65 parts by mass of the pre-dried chip B, and 10 parts by mass of the chip C were mixed in a blender, and then the mixture was continuously supplied to a hopper right above the first extruder with a metering screw feeder. Then, the supplied mixture of the chips A to C was melt-extruded from a T-die of the first extruder of a single screw type at 260° C. (melt-extruded so as to be laminated on the outside of the intermediate layer laminated on each outside of the front and back surfaces of the core layer). In order to stabilize the extrusion from the T-die, a helical and parallel-type gear pump was interposed between the extruder and the T-die.

Formation of the Second and Fourth Layers (Adhesive Layers)

After pre-drying the above-mentioned chip D using a blender apparatus, the pre-dried chip D was continuously supplied to a hopper right above the second extruder with a metering screw feeder. Then, the chip D supplied was melt-extruded from a T-die of the second extruder of a single screw type (melt-extruded so as to be laminated on each outside of the front and back surfaces of the core layer). Note that the temperature of the second extruder was adjusted to 200° C. As in the case of the extrusion by means of the first extruder, in order to stabilize the extrusion from the T-die, a helical and parallel-type gear pump was interposed between the extruder and the T-die.

Formation of the Third Layer (Core Layer)

After pre-drying the above-mentioned chips E, F and G separately using a blender apparatus, the chips E, F and G were separately and continuously supplied to a mixer with a metering screw feeder. The supply of the chip E was adjusted to 43 mass %, the supply of the chip F was adjusted to 43 mass %, and the supply of the chip G was adjusted to 14 mass %. Thereafter, the mixture raw material of the chips E, F and G mixed in the mixer was continuously supplied to a hopper right above the third extruder with a metering screw feeder. Then, the chips E, F and G supplied (that had been already mixed) were melt-extruded from a T-die of the third extruder of a single screw type. Note that the temperature of the third extruder was also adjusted to 200° C. As in the cases of the extrusion by means of the first extruder and the extrusion by means of the second extruder, in order to stabilize the extrusion from the T-die, a helical and parallel-type gear pump was interposed between the extruder and the T-die.

In the extrusions of the resins by means of the above-mentioned extruders, the amounts of resins discharged from the first to third extruders in the formation of the undrawn film were adjusted such that the thickness of the first layer/the second layer/the third layer/the fourth layer/the fifth layer was to be 33/3/49/3/33 (total thickness: 121 μm). The evaluation results are shown in Table 4. The label was a satisfactory label without the occurrence of cracks.

Comparative Example 1

A film with a thickness of 18 μm was produced in the same manner as in Example 1 except that the melting temperature was raised to 310° C. The evaluation results are shown in Table 4. The tensile elongation at break in the longitudinal direction, the intrinsic viscosity, and the difference in specific heat capacity ΔCp between at a lower and a higher temperature than Tg of the label decreased due to aging compared with those of the film. The label was an inappropriate label with the occurrence of cracks.

Comparative Example 2

A film with a thickness of 18 μm was produced in the same manner as in Example 1 except that the mass ratio of the chips A and B was changed to 30:70. The evaluation results are shown in Table 4. The shrinkage in the longitudinal direction of the film was high, vertical shrinkage deterioration occurred, and hence, the label was an inappropriate label.

Comparative Example 3

A film with a thickness of 18 μm was produced in the same manner as in Example 2 except that the mass ratio of the chips A, B and C was changed to 5:80:15. The evaluation results are shown in Table 4. The intrinsic viscosity and the tensile elongation at break decreased due to aging, cracks occurred, and hence, the label was an inappropriate label.

Comparative Example 4

A film with a thickness of 4 μm was produced in the same manner as that in Example 2 except that the thickness of the undrawn film was changed to 27 μm. Although the intrinsic viscosity only decreased slightly due to aging, cracks occurred because of a small thickness of the label, and hence, the label was an inappropriate label.

Reference Example 1

A film with a thickness of 40 μm was produced in the same manner as that in Comparative Example 1 except that the thickness of the undrawn film was changed to 270 μm. The evaluation results are shown in Table 4. Although the intrinsic viscosity decreased due to aging, no crack occurred because of a large thickness of the label.

TABLE 3

| | layer structure | temperature of molten resin (° C.) | thickness of each layer before drawing (first lyaer/second layer/thrid layer/forth layer/fifth layer) (μm) | resin compositon of each layer (first lyaer/second layer/thrid layer/forth layer/fifth layer) |
|---|---|---|---|---|
| Example 1 | one type one layer | 260 | 121 | A:B:C = 20:70:10 |
| Example2 | one type one layer | 280 | 121 | A:B:C = 20:70:10 |
| Example3 | one type one layer | 260 | 121 | A:B:C = 30:60:10 |
| Example4 | one type one layer | 260 | 60 | A:B:C = 20:70:10 |
| Example5 | three type five layer | 260 | 33/3/49/3/33 (Total 121) | A:B:C/D/E:F:G/D/A:B:C = 25:65:10/100/43:43:14/ 100/25:65:10 |
| Comparative Example1 | one type one layer | 310 | 121 | A:B:C = 20:70:10 |
| Comparative Example 2 | one type one layer | 260 | 121 | A:B = 30:70 |
| Comparative Example 3 | one type one layer | 280 | 121 | A:B:C = 5:80:15 |
| Comparative Example 4 | one type one layer | 280 | 27 | A:B:C = 20:70:10 |
| Reference Example 1 | one type one layer | 310 | 270 | A:B:C = 20:70:10 |

| | drawing condition of lengthwise (longitudinal direction) | | drawing condition of transverse (width direction) | | | |
|---|---|---|---|---|---|---|
| | | | preheating process | drawing process | | heating process |
| | preset temperature of roll surface (° C.) | drawing ratio | preset temperature (° C.) | preset temperature (° C.) | drawing ratio | preset temperature (° C.) |
| Example 1 | 85 | 1.5 | 100 | 75 | 4.5 | 88 |
| Example2 | 85 | 1.5 | 100 | 75 | 4.5 | 88 |
| Example3 | 85 | 1.5 | 100 | 75 | 4.5 | 88 |
| Example4 | 85 | 1.5 | 100 | 75 | 4.5 | 88 |
| Example5 | 85 | 1.5 | 100 | 80 | 4.5 | 88 |
| Comparative Example1 | 85 | 1.5 | 100 | 75 | 4.5 | 88 |
| Comparative Example 2 | 85 | 1.5 | 100 | 75 | 4.5 | 88 |
| Comparative Example 3 | 85 | 1.5 | 100 | 75 | 4.5 | 88 |
| Comparative Example 4 | 85 | 1.5 | 100 | 75 | 4.5 | 88 |
| Reference Example 1 | 85 | 1.5 | 100 | 75 | 4.5 | 88 |

TABLE 4A properties of the film

| | thickness (μm) | Hot-Water Heat Shrinkage at 90° C. (%) | | Tensile Strength at Break (MPa) | | Tensile Elongation Break (%) | | Intrinsic Viscosity (dl/g) | Absorbancy Ratio | | | ΔCp J/(g·° C.) |
|---|---|---|---|---|---|---|---|---|---|---|---|---|
| | | width direction | longitudinal direction | width direction | longitudinal direction | width direction | longitudinal direction | | width direction | longitudinal direction | difference | |
| Example 1 | 18 | 71 | 3 | 290 | 80 | 90 | 660 | 0.67 | 0.81 | 0.35 | 0.46 | 0.49 |
| Example2 | 18 | 67 | 1 | 279 | 71 | 88 | 635 | 0.62 | 0.78 | 0.33 | 0.45 | 0.47 |
| Example3 | 18 | 59 | 3 | 298 | 85 | 82 | 620 | 0.67 | 0.85 | 0.39 | 0.46 | 0.42 |
| Example4 | 9 | 70 | 1 | 292 | 78 | 89 | 663 | 0.67 | 0.82 | 0.34 | 0.48 | 0.49 |
| Example5 | 18 | 73 | 0 | 230 | 48 | 105 | 750 | 0.67 | 0.73 | 0.32 | 0.41 | 0.5 |
| Comparative Example1 | 18 | 63 | 1 | 266 | 66 | 82 | 601 | 0.58 | 0.75 | 0.31 | 0.44 | 0.42 |
| Comparative Example 2 | 18 | 67 | 16 | 310 | 75 | 95 | 680 | 0.68 | 0.83 | 0.36 | 0.47 | 0.47 |
| Comparative Example 3 | 18 | 74 | 2 | 294 | 62 | 91 | 665 | 0.62 | 0.78 | 0.31 | 0.47 | 0.5 |
| Comparative Example 4 | 4 | 63 | 0 | 265 | 67 | 96 | 645 | 0.62 | 0.76 | 0.31 | 0.45 | 0.45 |
| Reference Example 1 | 40 | 65 | 1 | 272 | 63 | 80 | 595 | 0.58 | 0.76 | 0.32 | 0.44 | 0.42 |

TABLE 4B label propertiels after aging

| | Tensile Strength at Break (MPa) | | Tensile Elongation at Break (%) | | Intrinsic Viscosity (dl/g) | Absorbancy Ratio | | | ΔCP J/(g·° C.) | Strains of Label | Presence or absence of the occurrence of cracks | ΔCp J/(g·° C.) |
|---|---|---|---|---|---|---|---|---|---|---|---|---|
| | width direction | longitudinal direction | width direction | longitudinal direction | | width direction | longitudinal direction | difference | | | | |
| Example 1 | 225 | 23 | 28 | 11 | 0.62 | 0.70 | 0.31 | 0.39 | 0.29 | good | good | 0.49 |
| Example2 | 200 | 15 | 27 | 7 | 0.58 | 0.67 | 0.30 | 0.37 | 0.25 | good | good | 0.47 |
| Example3 | 237 | 26 | 31 | 12 | 0.63 | 0.84 | 0.37 | 0.47 | 0.24 | good | good | 0.42 |
| Example4 | 221 | 13 | 23 | 8 | 0.6 | 0.70 | 0.31 | 0.39 | 0.26 | good | good | 0.49 |
| Example5 | 125 | 10 | 11 | 6 | 0.61 | 0.71 | 0.30 | 0.41 | 0.28 | good | good | 0.5 |
| Comparative Example1 | 105 | 9 | 18 | 4 | 0.53 | 0.67 | 0.30 | 0.37 | 0.19 | good | poor | 0.42 |
| Comparative Example 2 | 235 | 20 | 33 | 9 | 0.62 | 0.72 | 0.30 | 0.42 | 0.28 | poor | good | 0.47 |
| Comparative Example 3 | 182 | 7 | 20 | 3 | 0.55 | 0.65 | 0.28 | 0.37 | 0.23 | good | poor | 0.5 |
| Comparative Example 4 | 175 | 11 | 24 | 5 | 0.57 | 0.66 | 0.28 | 0.38 | 0.20 | good | poor | 0.45 |
| Reference Example 1 | 120 | 11 | 23 | 5 | 0.54 | 0.67 | 0.31 | 0.36 | 0.20 | good | good | 0.42 |

INDUSTRIAL APPLICABILITY

The label of the present invention can meet the needs for reduction in thickness and suppress the occurrence of cracks during transport. Therefore, the label of the present invention is useful as a label or the like of a bottle for beverage.

The invention claimed is:

1. A polyester label comprising a drawn base film having a thickness of 8 μm or more and 30 μm or less before heat shrinkage, wherein the polyester label after aging 60 days at 45° C. satisfies the following requirements (1) to (6):
   (1) the base film after heat shrinkage has an intrinsic viscosity of 0.58 dl/g or more,
   (2) the label has a tensile elongation at break of 5% or more in both a main shrinkage direction of the label and a direction orthogonal to the main shrinkage direction of the label, wherein the main shrinkage direction is the direction with the largest shrinkage of the film,
   (3) when an absorbancy at 1340 cm$^{-1}$ and an absorbancy at 1410 cm$^{-1}$ are measured for the base film constituting the label by a polarized ATR method, a difference between an absorbancy ratio (absorbancy at 1340 cm$^{-1}$/absorbancy at 1410 cm$^{-1}$) in the main shrinkage direction of the label and an absorbancy ratio (absorbancy at 1340 cm$^{-1}$/absorbancy at 1410 cm$^{-1}$) in the direction orthogonal to the main shrinkage direction of the label is 0.2 or more,
   (4) when a reversible heat capacity curve is measured for the label after shrinkage with a temperature modulated differential scanning calorimeter, the base film constituting the label has a difference in specific heat capacity ΔCp, as defined by the following formula, of 0.2 J/(g·° C.) or more:

ΔCp (J/(g·° C.))=(heat capacity at a temperature higher than Tg)−(heat capacity at a temperature lower than Tg), (5) the label has a difference between a maximum value and a minimum value of a length in a vertical direction of the label of 3 mm or less with respect to the strains of the label, and (6) the label has a tensile strength at break in the direction orthogonal to the main shrinkage direction of the label of 5 MPa or more and 60 MPa or less.

2. The polyester label according to claim 1, wherein the polyester constituting the label has 5 mol % or more and 15 mol % or less of a unit derived from propanediol in 100 mol % of constituent units of the polyester.

3. A package container having the label according to claim 1 on at least a part of the outer periphery of the container.

4. A package container having the label according to claim 2 on at least a part of the outer periphery of the container.

5. The polyester label according to claim 1, wherein the polyester constituting the label comprises (i) 50 mol % or more of a unit derived from ethylene terephthalate unit and (ii) 5 mol % or more and 15 mol % or less of a unit derived from propanediol in 100 mol % of constituent units of the polyester.

6. The polyester label according to claim 5, wherein the polyester comprises 17% or more of the sum of at least one monomer component that can form an amorphous component in 100 mol % of a polyhydric alcohol component or in 100 mol % of a polybasic carboxylic acid component in the whole polyester resin.

7. The polyester label according to claim 6, wherein the polyester contains no diols having 8 or more carbon atoms, and wherein the polyester contains no polyhydric alcohols of trihydric or more.

8. The polyester label according to claim 6, wherein the polyester contains no polybasic carboxylic acids of tribasic or more.

9. A package container having the label according to claim 5 on at least a part of the outer periphery of the container.

10. A package container having the label according to claim 6 on at least a part of the outer periphery of the container.

11. A package container having the label according to claim 7 on at least a part of the outer periphery of the container.

12. A package container having the label according to claim 8 on at least a part of the outer periphery of the container.

* * * * *